(12) United States Patent
Rose et al.

(10) Patent No.: US 11,428,123 B2
(45) Date of Patent: Aug. 30, 2022

(54) ENGINE NACELLE FOR A GAS TURBINE ENGINE

(71) Applicant: Rolls-Royce Deutschland Ltd & Co KG, Blankenfelde-Mahlow (DE)

(72) Inventors: Marco Rose, Freiberg (DE); Gregory Mack, Berlin (DE); Christoph Richter, Berlin (DE); Fredi Holste, Berlin (DE); Carlos Omar Marquez Gutierrez, Berlin (DE); Jürgen Dierke, Blankenfelde-Mahlow (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 17/235,542

(22) Filed: Apr. 20, 2021

(65) Prior Publication Data

US 2021/0348525 A1 Nov. 11, 2021

(30) Foreign Application Priority Data

May 11, 2020 (DE) .......................... 102020112687.5

(51) Int. Cl.
*F01D 25/26* (2006.01)
*F01D 25/24* (2006.01)

(52) U.S. Cl.
CPC ............ *F01D 25/24* (2013.01); *F01D 25/265* (2013.01); *F05D 2220/32* (2013.01); *F05D 2220/80* (2013.01)

(58) Field of Classification Search
CPC .... F01D 25/24; F01D 25/265; F05D 2220/32; F05D 2220/80; F05D 2250/182; F05D 2250/183; F05D 2250/41; F05D 2260/96; F05D 2250/323; F02C 7/045; F02C 7/04; B64D 29/06; B64D 32/02
See application file for complete search history.

(56) References Cited

U.S. PATENT DOCUMENTS 5,014,933 A 5/1991 Harm et al.
2018/0283276 A1 10/2018 Todorovic

FOREIGN PATENT DOCUMENTS

EP 2987989 B1 12/2017

OTHER PUBLICATIONS

German Search Report dated Jan. 12, 2021 from counterpart German Patent Application No. 102020112687.5.

*Primary Examiner* — Aaron R Eastman
(74) *Attorney, Agent, or Firm* — Shuttleworth & Ingersoll, PLC; Timothy J. Klima

(57) ABSTRACT

An engine pod for a gas turbine engine which includes a pod wall having an inside and an outside. The pod wall includes a fixed downstream portion and a displaceable upstream portion which is displaceable in the axial direction between a first upstream position and a second downstream position. At its downstream end facing the fixed portion, the upstream portion forms a radially outer rear edge and axially spaced therefrom a radially inner rear edge, with a recess in between. It is provided that adjacent to the recess, an air-permeable structure is formed in the upstream portion which is intended and configured, in the first upstream position of the displaceable portion, to conduct air flowing in the region of the recess to the inside of the displaceable portion. According to a further aspect of the invention, the axial position of the radially inner rear edge varies in the circumferential direction.

20 Claims, 9 Drawing Sheets

ENGINE NACELLE FOR A GAS TURBINE ENGINE

This application claims priority to German Patent Application DE102020112687.5 filed May 11, 2020, the entirety of which is incorporated by reference herein.

The invention relates to an engine pod for a gas turbine engine as disclosed herein.

In general, it is advantageous if the engine intake of a gas turbine engine has thick intake lips in the starting phase in order to minimize flow separation, which may occur because of excessive overspeed if the intake lips are too thin, and hence to provide an adequate mass flow. In the cruising flight phase however, it is advantageous if the engine has thin intake lips.

In order to best fulfil these different requirements, a variable pod geometry is known in which the engine pod has a fixed portion and a displaceable portion. A variable pod geometry is used in particular with supersonic engine intakes in which the intake lips are generally thinner.

Thus for example US 2018/0283276 A1 discloses an engine intake for primarily supersonic applications, with a fixed portion and a displaceable portion. An additional flow channel, through which additional air can flow into the engine intake, is provided when the displaceable portion has been moved into an upstream position.

Such supersonic engine intakes however, because of flow separation and eddying at the rear edges of the displaceable portion, generate noise when the displaceable portion is moved axially forward and a gap flow is created through the additional flow channel.

The present invention is based on the object of providing an engine pod for a gas turbine engine which reduces the noise generated by the engine intake.

This object is achieved by an engine pod having features as disclosed herein. Refinements of the invention are indicated in the disclosure.

Accordingly, in a first inventive aspect, the invention relates to an engine pod for a gas turbine engine, which comprises a pod wall having an inside and an outside. An engine intake, which receives the air necessary for an associated gas turbine engine, is delimited by the inside of the pod wall. The pod wall comprises a fixed downstream portion and a displaceable upstream portion which is displaceable in the axial direction relative to the fixed portion between a first upstream position and a second downstream position. In the first upstream position of the displaceable portion, an annular additional flow channel is formed which extends between the fixed portion and the displaceable portion, wherein via the additional flow channel, surrounding air can flow into the engine intake from the outside of the engine pod, upstream of the fan of the associated gas turbine engine. In the second downstream position of the displaceable portion, the fixed portion and the displaceable portion adjoin one another, wherein the additional flow channel is closed.

At its downstream end facing the fixed portion, the upstream portion forms a radially outer rear edge and axially spaced therefrom a radially inner rear edge, with a recess in between.

It is provided that adjacent to the recess, an air-permeable structure is formed in the upstream portion which is intended and configured, in the first upstream position of the displaceable portion, to conduct air flowing in the region of the recess to the inside of the displaceable portion.

The first inventive aspect is based on the concept of reducing the noise generated by the flow through the additional flow channel, in that the air-permeable structure dissipates or limits the physical size of turbulence forming in the region of said recess. This is achieved in that the air-permeable structure allows a pressure balance which disrupts the formation of eddies. The turbulent air in the region of the recess may flow through the displaceable portion to the inside of the displaceable portion, and hence into the engine intake upstream of the additional flow channel. Since because of the invention, eddies in the region of said recess are prevented or at least spatially limited, the flow through the additional flow channel as a whole is improved and noise generation minimized.

According to one embodiment of the invention, it is provided that the air-permeable structure is configured as a sandwich panel with a core layer in honeycomb form and with an inner cover layer, wherein the inner cover layer is provided with openings for air passage. This ensures that air can flow from the recess towards the inside of the displaceable portion. The core layer in honeycomb form comprises a plurality of cells, each of which defines a cavity.

One embodiment provides that the sandwich panel furthermore forms an outer cover layer, wherein the outer cover layer is also provided with openings for air passage. The openings in the outer cover layer may be formed differently from the openings in the inner cover layer, i.e. the respective openings may differ in size, shape and/or position. They may however also be configured identically. The cells of the core layer extend between the inner cover layer and the outer cover layer.

It is pointed out that the design of the air-permeable structure as a sandwich panel with a core layer in honeycomb form is purely exemplary. In principle, any air-permeable structures are suitable which allow air to be conducted from the recess to the inside of the displaceable portion. A possible alternative for example is that the air-permeable structure is formed by a plurality of tubes which extend between the recess and the inside in the displaceable portion.

A further embodiment provides that the air-permeable structure extends radially from the recess to the inside of the displaceable portion. If the air-permeable structure is configured as a sandwich panel with a core layer in honeycomb form, the individual cells which form the core layer extend for example substantially up to the inside of the displaceable structure. The inner cover layer of the sandwich panel here forms part of the inside of the displaceable portion or the inner surface of the engine intake.

One embodiment of the invention provides that at its upstream end, the fixed portion has a convex intake lip, the shape of which corresponds to the shape of the concave recess of the displaceable portion. Accordingly, when the displaceable portion is in the second downstream position, the intake lip and recess bear on one another. This ensures an airtight closure of the additional flow channel in the second position.

A further embodiment provides that in the second downstream position of the displaceable portion, the air-permeable structure forms a sound-absorbing panel for engine noise. This is achieved by a plurality of cells forming the core layer of the air-permeable structure. Thus several mechanisms contribute to the sound absorption. One of the mechanisms is based on interference between incident and reflected waves. The cells have a cell depth and each define a cavity. Because of interference, incident sound waves are at least partially extinguished by the waves reflected on a hard rear side of the cells, depending on wavelength. In particular, incident waves are extinguished by interference if the cell depth is equal to λ/4 or a non-integral multiple of λ/4, wherein λ is the wavelength of the sound waves.

In one embodiment, the hard rear side necessary for sound reflection is formed by the intake lip of the fixed portion. The rear side which reflects the sound waves is thus provided by a region of the wall of the fixed portion. Thus there is no need for a separate outer cover layer of the air-permeable structure, which may be advantageous for allowing as effective as possible a flow of air through the air-permeable structure when the displaceable portion is in the upstream position and eddies form in the recess between the radially outer rear edge and the radially inner edge.

It is pointed out that the air-permeable structure may be furthermore suitable for conducting air from the inside of the displaceable portion to the outside of the displaceable portion. Thus depending on the flight conditions, situations may arise in which the pressure on the inside of the displaceable portion is greater than on the outside of the displaceable portion, in which case air can flow to the outside through the air-permeable structure.

According to a further embodiment of the invention, it is provided that a sound-absorbing structure is integrated in the fixed portion of the pod wall and is positioned in the fixed portion such that, in the second downstream position of the displaceable portion, it comes into contact with the air-permeable structure of the upstream portion. It must be noted here that the air-permeable structure, when in contact with the fixed portion, acts to absorb sound in particular when, as described, it forms a sound-absorbing panel for engine noise in the second downstream position of the displaceable portion. There are then two sound-absorbing regions arranged adjacent to one another, which improves the sound absorption as a whole.

One embodiment variant provides that the sound-absorbing structure of the fixed portion is configured as a sandwich panel with a core layer in honeycomb form and with an inner cover layer, wherein the inner cover layer is provided with openings for air passage, and wherein in the second downstream position of the displaceable portion, the inner cover layer adjoins the sound-absorbing panel or comes into contact therewith, so that the two panels form an improved sound-absorbing structure.

A further embodiment of the invention provides that the axial position of the radially inner rear edge varies in the circumferential direction. This disrupts the coherence of the separation of the air at the radially inner rear edge, which runs behind the radially outer rear edge with respect to the axial direction, in the circumferential direction. The reduced coherence of the separation disrupts the generation of sound waves caused by eddies in the recess and limits the generation of noise.

An embodiment provides that the axial position of the radially inner rear edge varies periodically in the circumferential direction. However, this is not necessarily the case. Further embodiments may provide that the axial position of the radially inner rear edge undergoes a variation in the circumferential direction which is non-periodic.

An embodiment provides that the axial position of the radially inner rear edge varies in undulating form, for example sinusoidally, in the circumferential direction.

A further embodiment provides that the axial position of the radially inner rear edge varies in rectangular form in the circumferential direction.

A further embodiment provides that the axial position of the radially inner rear edge varies in zigzag form in the circumferential direction.

In a second aspect of the invention, the present invention relates to an engine pod for a gas turbine engine, which comprises a pod wall having an inside and an outside. An engine intake, which receives the air necessary for an associated gas turbine engine, is delimited by the inside of the pod wall. The pod wall comprises a fixed downstream portion and a displaceable upstream portion which is displaceable in the axial direction relative to the fixed portion between a first upstream position and a second downstream position. In the first upstream position of the displaceable portion, an annular additional flow channel is formed which extends between the fixed portion and the displaceable portion, wherein via the additional flow channel, surrounding air can flow into the engine intake from the outside of the engine pod, upstream of the fan of the associated gas turbine engine. In the second downstream position of the displaceable portion, the fixed portion and the displaceable portion adjoin one another, wherein the additional flow channel is closed.

At its downstream end facing the fixed portion, the upstream portion forms a radially outer rear edge and a radially inner rear edge axially spaced therefrom. It may be provided that a concave recess is formed between the radially outer rear edge and the radially inner rear edge. It is provided that the axial position of the radially inner rear edge varies in the circumferential direction.

The second inventive aspect is based on the knowledge that disrupting the coherence of the separation of the air at the radially inner rear edge in the circumferential direction reduces the generation of noise. Such disruption of the coherence of the separation of the air is provided by varying the axial position of the radially inner rear edge in the circumferential direction. The flow surfaces upstream of the radially inner rear edge vary radially in the circumferential direction for a respective axial position. The reduced coherence of the separation disrupts the generation of sound waves and limits the occurrence of noise.

For the case where a recess is formed between the radially outer rear edge and the radially inner rear edge, the variation in axial position of the radially inner rear edge in the circumferential direction disrupts the formation of eddies in the recess, so that air flowing in through the additional flow channel can flow around the rear edges of the displaceable portion with turbulence which varies spatially in the circumferential direction and hence generates less noise.

An embodiment of the second inventive aspect provides that the axial position of the radially inner rear edge varies periodically in the circumferential direction. However, this is not necessarily the case. Further embodiments may provide that the axial position of the radially inner rear edge undergoes a variation in the circumferential direction which is non-periodic.

An embodiment provides that the axial position of the radially inner rear edge varies in undulating form, for example sinusoidally, in the circumferential direction.

A further embodiment provides that the axial position of the radially inner rear edge varies in rectangular form in the circumferential direction.

A further embodiment provides that the axial position of the radially inner rear edge varies in zigzag form in the circumferential direction.

The present invention is fundamentally suitable both for use in gas turbine engines designed for subsonic operation and also for use in gas turbine engines designed for supersonic operation. According to one embodiment of the invention, the engine pod according to the invention is implemented in a gas turbine engine used in a civil or military supersonic aircraft. For this case, the engine intake is designed as a supersonic intake.

In a further aspect, the invention concerns a gas turbine engine with an engine intake according to the present disclosure, and a civil or military aircraft, in particular a supersonic aircraft, with such a gas turbine engine.

It is pointed out that the present invention is described with reference to a cylindrical coordinate system which has the coordinates x, r, and φ. Here, x indicates the axial direction, r indicates the radial direction, and φ indicates the angle in the circumferential direction. The axial direction is in this case identical to the machine axis of a gas turbine engine with the engine pod according to the invention. Proceeding from the x-axis, the radial direction points radially outward. Terms such as "in front of", "behind", "front", and "rear" always relate to the axial direction, or the flow direction in the engine. The expression "in front of" thus means "upstream of", and the expression "behind" means "downstream of". Terms such as "outer" or "inner" always relate to the radial direction.

The invention will be explained in more detail below on the basis of a plurality of exemplary embodiments with reference to the figures of the drawing. In the drawing.

Figure 10:
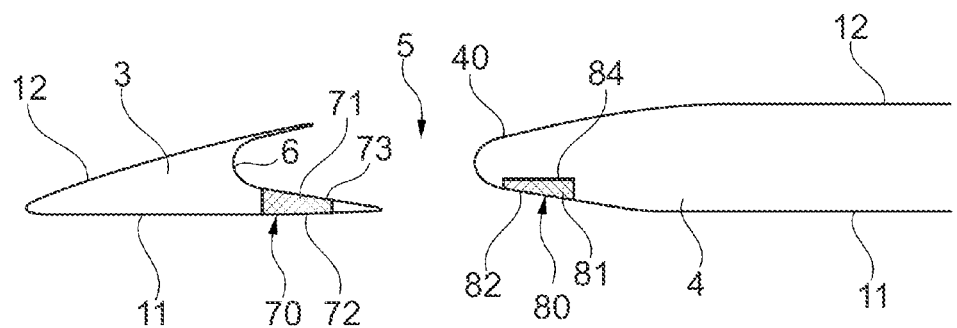
Figure 11:
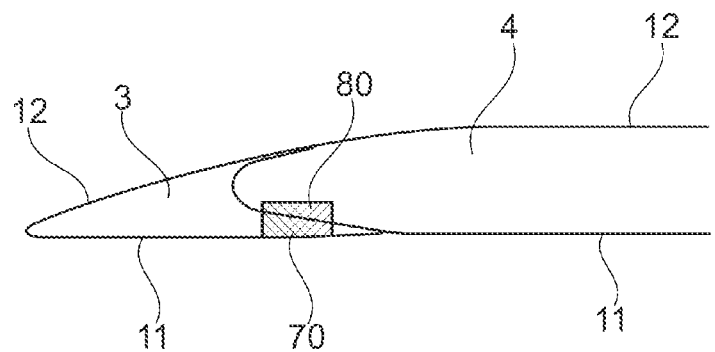

FIG. 10 shows a further exemplary embodiment of an engine pod which forms a fixed portion and a displaceable portion, wherein a honeycomb structure is formed in both the displaceable portion and in the fixed portion, and wherein the displaceable portion is arranged axially spaced from the fixed portion, forming an additional flow channel; and FIG. 11 shows the exemplary embodiment from FIG. 10, wherein the displaceable portion and the fixed portion are arranged adjoining one another.

Figure 1:
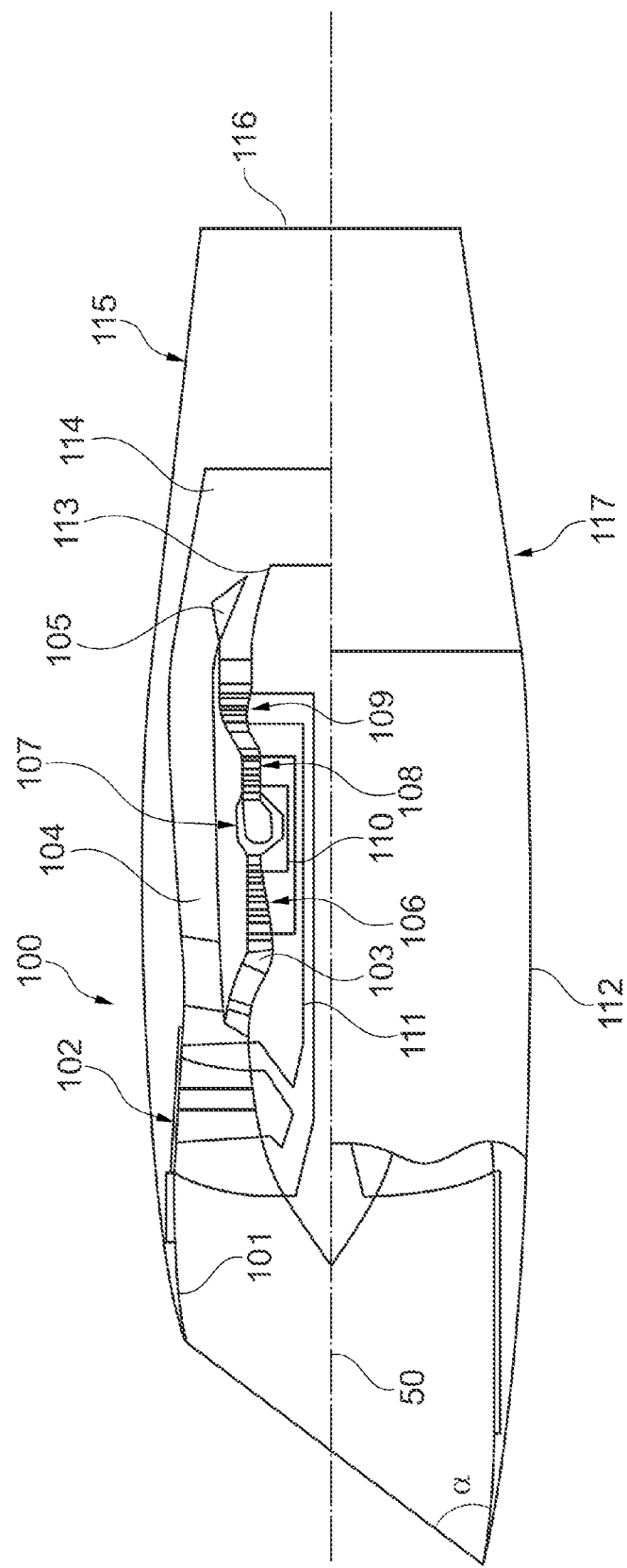
FIG. 1 is a simplified, schematic, sectional illustration of a gas turbine engine in which the present invention can be realized, wherein the gas turbine engine is suitable for use in a civilian or military supersonic aircraft.

FIG. 1 shows schematically a gas turbine engine which is provided and suitable for use in a civilian or military supersonic aircraft and which is accordingly designed for operating states in the subsonic range, in the transonic range and in the supersonic range. However, it is pointed out that the principles of the present invention may be implemented similarly in a gas turbine engine which is designed purely for subsonic operation. The description of the invention in the context of an engine provided for a supersonic aircraft should to this extent be regarded as merely exemplary.

The gas turbine engine 100 comprises an engine intake 101, a fan 102 which may be of multi-stage design, a primary flow channel 103 which leads through a core engine, a secondary flow channel 104 which leads past the core engine, a mixer 105 and a convergent-divergent thrust nozzle 115 in which a thrust reverser 117 may be integrated.

The gas turbine engine 100 has a machine axis or engine centerline 50. The machine axis 50 defines an axial direction of the gas turbine engine. A radial direction of the gas turbine engine runs perpendicularly to the axial direction.

The core engine has, in a manner known per se, a compressor 106, a combustion chamber 107 and a turbine 108, 109. In the exemplary embodiment illustrated, the compressor comprises a high-pressure compressor 106. A low-pressure compressor is formed by those regions of the multi-stage fan 102 which are close to the hub. The turbine, which is arranged downstream of the combustion chamber 107, comprises a high-pressure turbine 108 and a low-pressure turbine 109. The high-pressure turbine 108 drives a high-pressure shaft 110 which connects the high-pressure turbine 108 to the high-pressure compressor 106. The low-pressure turbine 109 drives a low-pressure shaft 111 which connects the low-pressure turbine 109 to the multi-stage fan 102. In an alternative embodiment, the gas turbine engine may additionally have a medium-pressure compressor, a medium-pressure turbine and a medium-pressure shaft. Furthermore, in an alternative embodiment, it may be provided that the fan 102 is coupled to the low-pressure shaft 111 via a reduction gear, for example a planetary gear mechanism.

The gas turbine engine is arranged in an engine pod 112. This is for example connected via a pylon to the aircraft fuselage.

The engine intake 101 forms a supersonic air intake and is accordingly provided and suitable for decelerating the inflowing air to speeds below Ma 1.0 (Ma=Mach number). The engine intake is inclined in FIG. 1 (but it need not necessarily be inclined) so as to form an angle α, wherein the lower edge protrudes relative to the upper edge. This serves to avoid vertical compression shocks in supersonic flight, which are unfavorable with respect to energy. It is however basically also possible for the engine intake to be of straight form, i.e. formed with an angle α of 90°, or formed with another angle.

The flow channel through the fan 102 is divided, downstream of the fan 102, into the primary flow channel 103 and the secondary flow channel 104. The secondary flow channel 104 is also referred to as the bypass channel.

Downstream of the core engine, the primary flow in the primary flow channel 103 and the secondary flow in the secondary flow channel 104 are mixed by the mixer 105.

Furthermore, downstream of the turbine, an exit cone 113 is formed for realizing desired cross-sections of the flow channel.

The rear region of the gas turbine engine is formed by an integral thrust nozzle 115, wherein the primary flow and the secondary flow are mixed in the mixer 105 before being conducted into the integral thrust nozzle 115. Here, downstream of the mixer 105, the engine forms a flow channel 114 which extends through the thrust nozzle 115. Alternatively, separate thrust nozzles may be provided for the primary flow channel 103 and the secondary flow channel 104. It may furthermore be provided that an axially extending central body is arranged in the flow channel 114 of the thrust nozzle 115, which body may be axially displaceable in some embodiment variants (so-called "plug nozzle").

In the context of the present invention, the design of the engine pod and engine intake is of importance.

Figure 2:
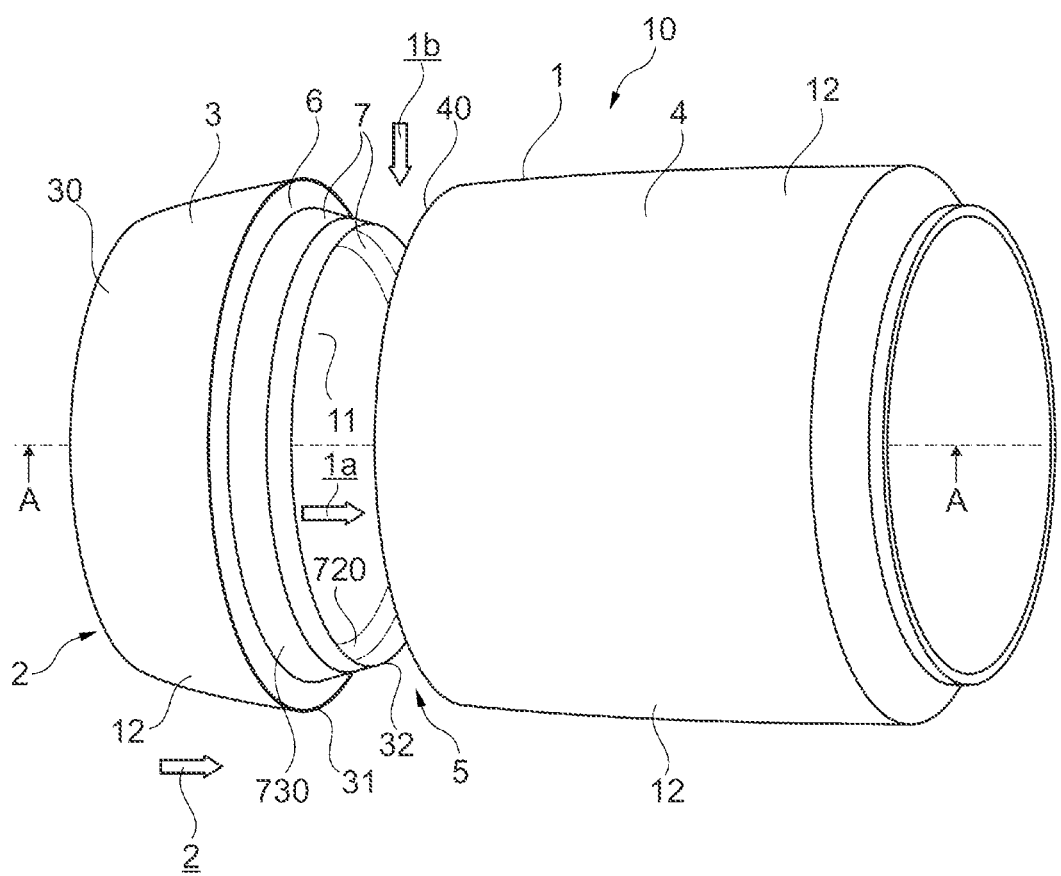
FIG. 2 shows in perspective view an exemplary embodiment of an engine pod forming a fixed portion and a displaceable portion, wherein an air-permeable panel is formed adjacent to a recess formed by the displaceable portion at its downstream end between a radially outer and a radially inner rear edge.

According to FIG. 2, the engine pod 10 comprises a pod wall 1 having an inside 11 and outside 12. The pod wall 1 consists of two portions, a fixed downstream portion 4 and a displaceable upstream portion 3. The displaceable portion 3 is displaceable in the axial direction relative to the fixed portion 4 between an upstream position and a downstream position.

The displaceable portion 3 and the fixed portion 4 also each have an inside and an outside, wherein the inside of the displaceable portion 3 and the inside of the fixed portion 4 form the inside 11 of the pod wall 1, and the outside of the displaceable portion 3 and the outside of the fixed portion 4 form the outside 12 of the pod wall 1. The insides and outsides of the displaceable portion 3 and fixed portion 4 are therefore also referred to below with the reference signs 11, 12.

The inside 11 of the pod wall 1 delimits an engine intake 2 which receives the main air flow 1a required for the associated gas turbine engine.

The displaceable portion 3 forms an intake lip 30 at its upstream front edge. The fixed portion 4 forms an intake lip 40 at its upstream front edge. In the upstream position of the displaceable portion 3, an additional flow channel 5 is present between the fixed portion 4 and the displaceable portion 3, through which channel the surrounding air 2 can flow as an additional air flow 1b from the outside into the engine intake 2. The additional air flow 1b combines with the main air flow 1a and the two are conducted to a fan of the associated gas turbine engine. In the downstream position of the displaceable portion 3, the displaceable portion 3 and the fixed portion 4 adjoin one another so that the additional flow channel 5 is closed.

In order to move the displaceable portion 3 relative to the fixed portion 4, the engine pod 10 comprises a plurality of actuators. These are configured in the known fashion and not shown separately in the figures. An exemplary embodiment of actuators is described in US 2018/0283276 A1.

The engine intake 2 is configured for example as a supersonic intake which reduces a supersonic inflow in the intake to a subsonic speed level for the flow onto the downstream fan and compressor. Numerous designs of the upstream portion 3 and upstream portion 4 of the pod wall 1 are possible. The exemplary embodiment shown in FIG. 1 should be regarded as merely schematic and exemplary. For example, alternatively it may be provided that the engine pod 1 is arranged with an incline, in order to achieve a favorable compression shock configuration in supersonic flight.

At its downstream end, the displaceable portion 3 forms a radially outer rear edge 31 and a radially inner rear edge 32, wherein the radially inner rear edge 32 is axially spaced from the radially outer rear edge 31 and has a smaller radius. On its outside, the upstream portion 3 forms a recess 6 between the radially outer rear edge 31 and the radially inner rear edge 32. This recess is concave.

Adjoining the recess 6, the upstream portion 3 forms an air-permeable structure 7 which extends radially from the outside 12 to the inside 11 of the upstream portion 3. The air-permeable structure 7 has an inside 720 and an outside 730. The inside 720 and outside 730 are configured to be air-permeable so that air can flow via these through the air-permeable structure 7.

Figure 3:
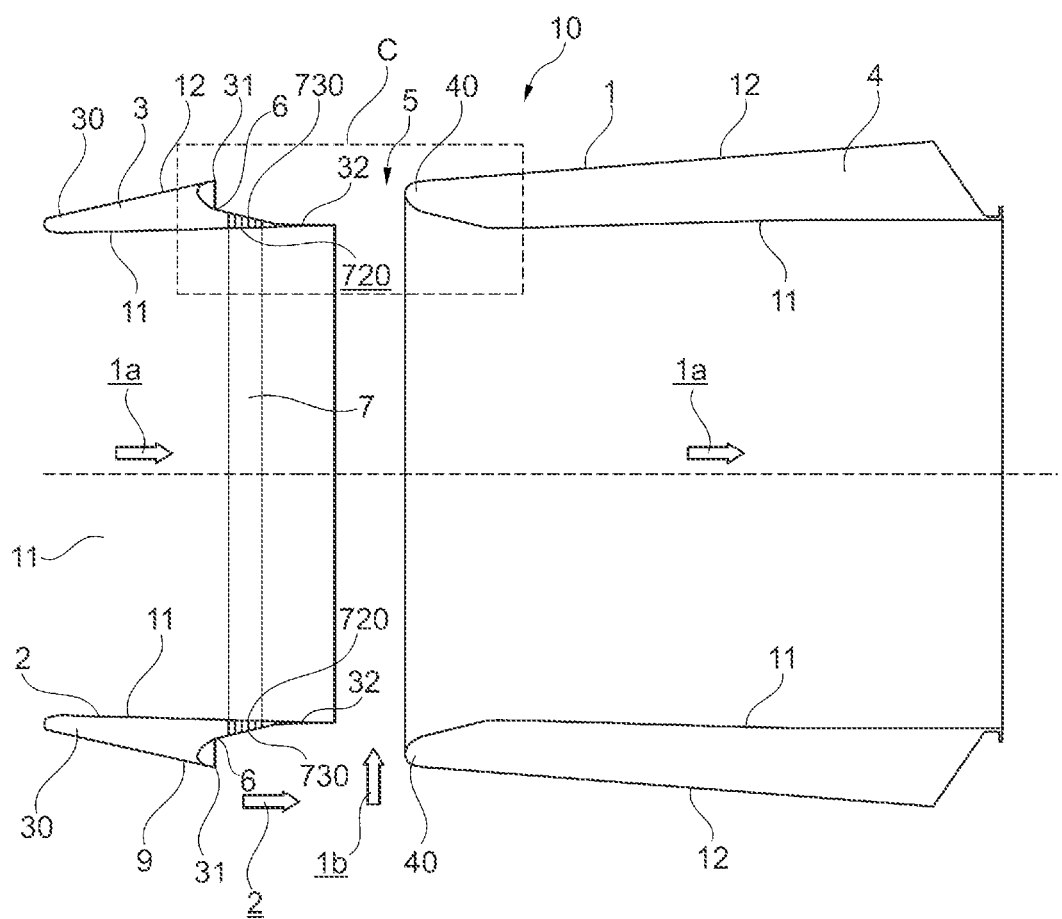
FIG. 3 shows a sectional view of the engine pod in FIG. 2 along line A-A of FIG. 2, wherein the displaceable portion is arranged axially spaced from the fixed portion, forming an additional flow channel.
Figure 4:
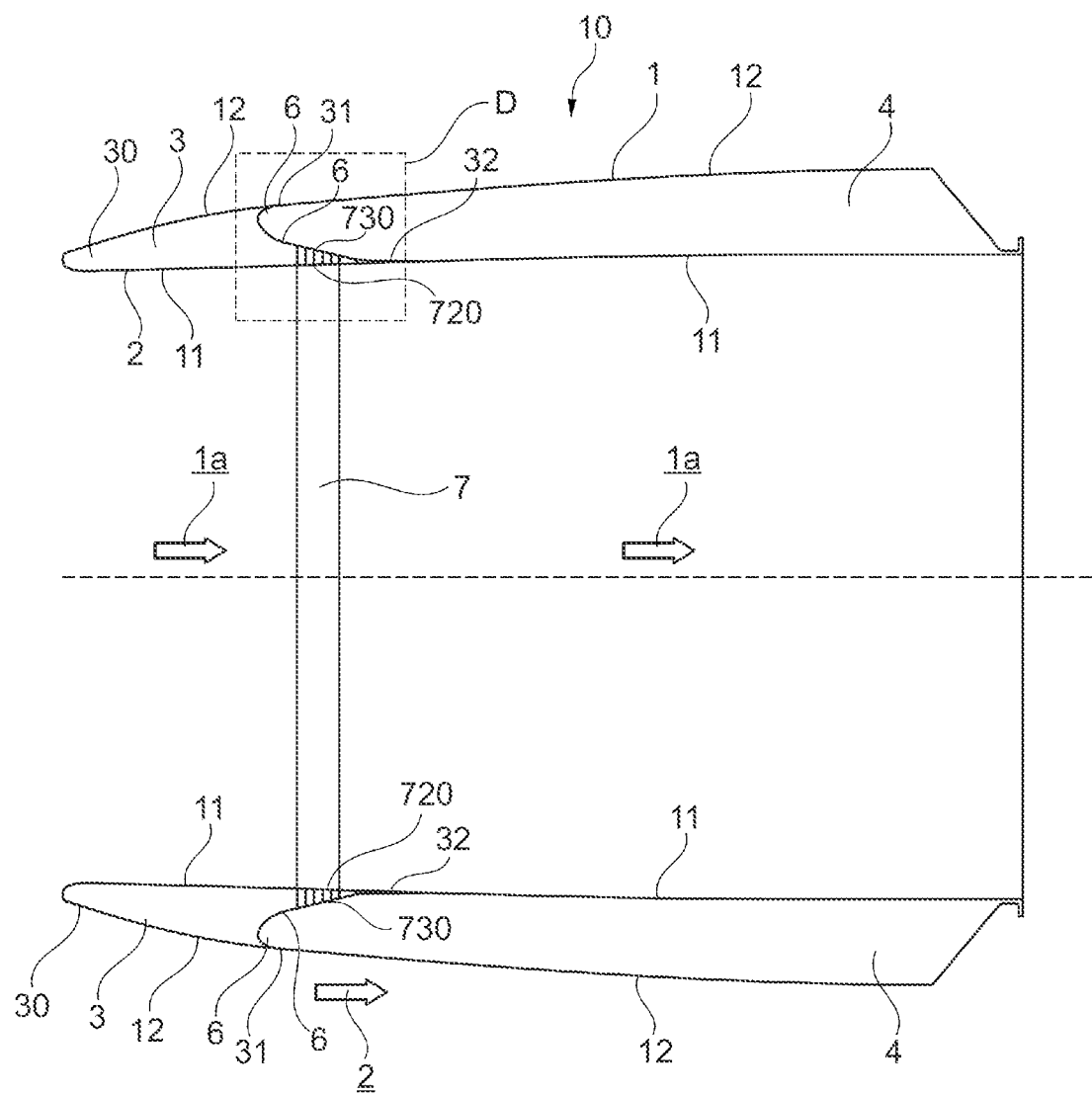
FIG. 4 shows a sectional view of the engine pod from FIG. 2, wherein the displaceable portion and the fixed portion are arranged adjoining one another.

FIG. 3 shows a sectional view of the engine pod 10 from FIG. 2, wherein the displaceable portion 3 has been moved upstream relative to the fixed portion 4. FIG. 4 shows a sectional view of the engine pod 10 from FIG. 2, wherein the displaceable portion 3 is in the downstream position so that the displaceable portion 3 and the fixed portion 4 adjoin one another and the additional flow channel 5 is closed. In the downstream position of the displaceable portion 3, the air-permeable structure 7 forms a sound-absorbing panel which absorbs engine noise propagating upstream through the engine intake 2. This is explained in more detail below with reference to FIGS. 5 and 6 which show an exemplary embodiment of the design of the air-permeable structure 7, wherein FIG. 5 shows an enlargement of portion C in FIG. 3, and FIG. 6 shows an enlargement of portion D in FIG. 4.

Figure 5:
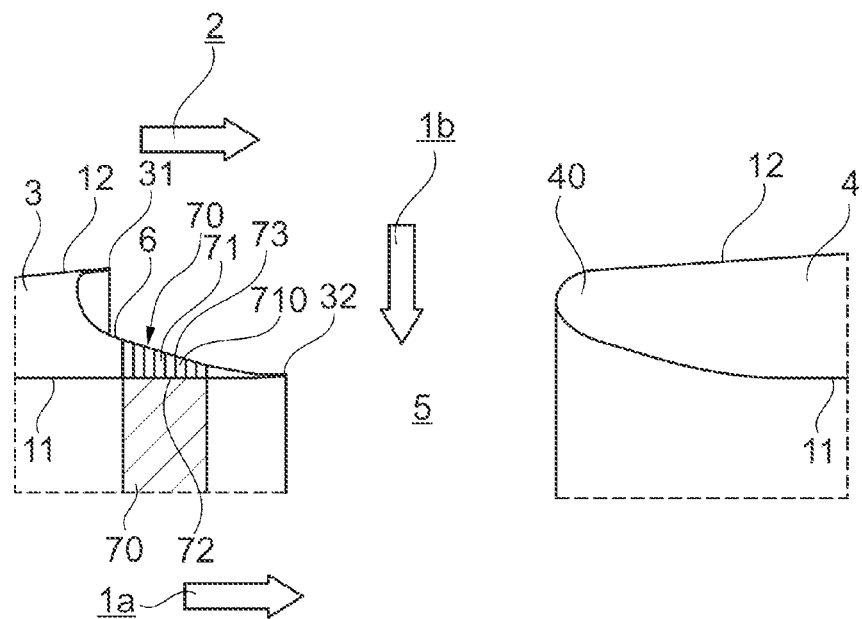
FIG. 5 shows an enlarged illustration of the downstream end of the displaceable portion and the upstream end of the fixed portion, according to region C of FIG. 3.
Figure 6:
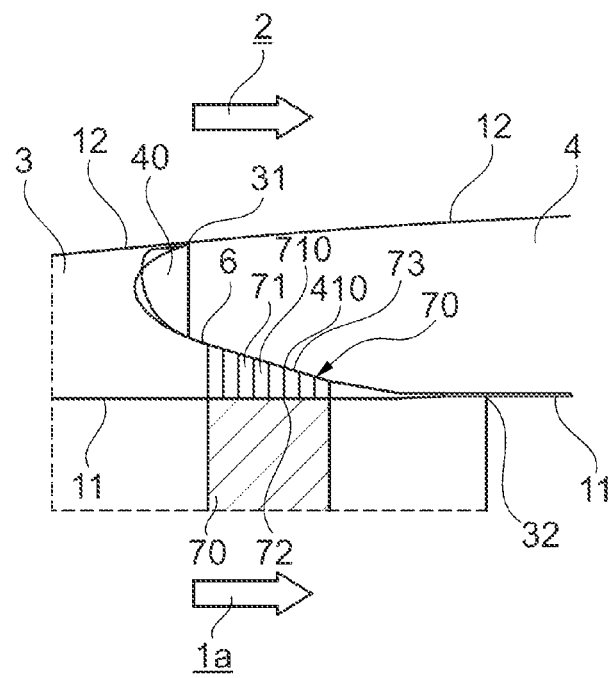
FIG. 6 shows an enlarged illustration of the downstream end of the displaceable portion and the upstream end of the fixed portion, according to region D of FIG. 4.

According to FIG. 5, the air-permeable structure 7 is formed for example by a sandwich panel 70. This has a core layer 71 in honeycomb form which forms a plurality of elongate cells 710, through which air flowing in the region of the recess 6 can be conducted to the inside 11 of the displaceable portion 3. In particular, the cells 710 divert the air, which flows in the recess 6 when surrounding air 2 is flowing in the additional flow channel, to the inside 11 of the displaceable portion. This prevents or at least reduces the occurrence of air turbulence in the recesses 6. This in turn allows an improved and more stable flow over the rear edges 31, 32 of the displaceable portion. Thus the additional air flow 1b in the additional flow channel 5 is improved as a whole, which leads to noise reduction.

In the presence of a pressure difference between the outside 12 in the region of the recess 6 and the inside 11, the core layer 71 or the cells 710 allows a through-flow of air and pressure balance between the two sides. In principle, it is also possible for air to flow radially outward from the inside 11 through the core layer 71 when corresponding pressure conditions prevail.

The sandwich panel 70 furthermore comprises an inner cover layer 72 which covers the core layer 71 on the inside. The inner cover layer 72 is provided with openings for air passage. It is formed for example by a perforated plate or perforated panel. The perforation is formed for example by an arrangement of small holes or by a woven mesh. The holes have for example a diameter in the range between 0.1 and 3 mm, for example 1 mm.

Furthermore, the sandwich panel 70 has an outer cover layer 73 which covers the core layer 71 on the outside. This is also provided with openings for air passage which may be formed in a similar fashion to or differently from the openings in the inner cover layer 72. The outer cover layer 73 is optional. Alternatively, the panel 70 has no outer cover layer 73, wherein the cells 710 of the core layer 71 extend as far as the recess 6.

The sandwich panel 70 fulfils a further function when the upstream portion 3 is in the downstream position, as will be explained below with reference to FIG. 6. It is firstly pointed out that the shape of the convex intake lip 40 of the fixed portion 4 corresponds to the shape of the recess 6 of the displaceable portion 3. Accordingly, the intake lip 40 and the recess 6 adjoin one another when the displaceable portion 3 is in the downstream position.

In the downstream position of the displaceable portion 3, the radially outer ends of the cells 710 of the core layer 71 are unilaterally and acoustically closed by the adjacent wall of the intake lip 40 which forms a solid rear side 410, in the sense that sound waves penetrating the cells 710 are reflected on the rear side 410 of the intake lip 40. This leads to interference which, in the known fashion, leads to an absorption of sound waves.

It may be provided that the sandwich panel 70 is formed without outer cover layer 73, since the solid rear side 410 of the intake lip 40 ensures sound reflection. It is however harmless for the explained function of sound absorption if the sandwich panel 70 is provided with an outer cover layer 73 as shown in FIG. 6. Insofar as the outer cover layer 73 already itself causes sound reflection, this is reinforced by the solid rear side 410 since a solid rear side 410 closes the openings formed in the outer cover layer 73. Insofar as the outer cover layer 73 does not substantially lead to sound reflection, this is fundamentally achieved by the solid rear side 410.

The air-permeable structure, which is formed for example as a sandwich panel 70 with a core layer in honeycomb form in FIGS. 5 and 6, thus fulfils two functions. The first function is achieved when the upstream portion 3 is moved into the upstream position. The air-permeable structure then serves to conduct the air from the recess 6 to the inside 11 of the displaceable portion in order to improve the flow and reduce the generation of noise. The second function is achieved when the upstream portion 3 is in the downstream position. The air-permeable structure then serves to implement a sound-absorbing effect on the engine noise propagating upstream.

FIGS. 10 and 11 show a derivative of the exemplary embodiment in FIGS. 3 to 6, in which a sandwich structure with a core layer in honeycomb form is formed both in the displaceable portion 3 and also in the fixed portion 4 of the engine pod. FIG. 10 here shows the displaceable portion 3 axially spaced from the fixed portion 4, and FIG. 11 shows the displaceable portion 3 adjoining the fixed portion 4.

An air-permeable structure, configured as a sandwich panel 70, is formed in the displaceable portion 4 adjacent to the recess 6. With respect to the design of this air-permeable structure with a core layer 71 in honeycomb form, with an inner cover layer 72 which covers the core layer 71 on the inside and is provided with openings for air passage, and with an optional outer cover layer 73 which covers the core layer 71 on the outside and is also provided with openings, reference is made to the description of FIGS. 5 and 6.

In the exemplary embodiment in FIGS. 10 and 11, furthermore a sound-damping structure is integrated in the fixed portion 4 adjacent to the inside 11 of the fixed portion 4. This is formed as a sandwich panel 80 with a core layer 81 in honeycomb form and an inner cover layer 82 which has openings for air passage. The core layer 81 in honeycomb form comprises a plurality of elongate cells which achieve sound damping in a fashion corresponding to that described for the elongate cells 710 of the core layer 71 of FIGS. 4 and 5. The rear side 84 of the sandwich panel 80 is however formed as a hard wall so that sound waves are reflected thereon.

In the closed state of the additional flow channel 5 shown in FIG. 11, when the displaceable portion 3 bears on the fixed portion 4, the sandwich panels 70, 80 of the two portions 3, 4 come to rest on one another. Thus the sandwich panel 80 is positioned in the fixed portion 4 such that in the closed state, it adjoins the sandwich panel 70 of the displaceable portion 3. As a result, the respective sound-absorbing structures 71, 81 transform into one another and form a complete sound-absorbing structure with improved thickness and sound absorption.

Figure 7:
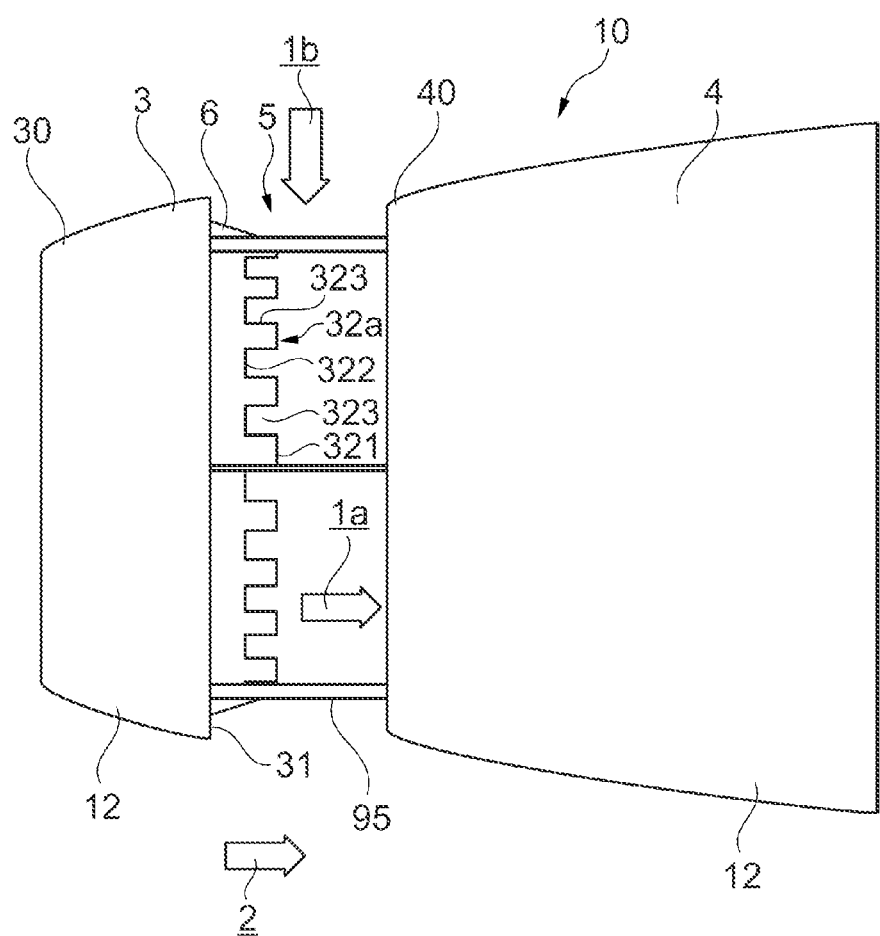
FIG. 7 shows a sectional view of an engine pod which forms a fixed portion and a displaceable portion, wherein the downstream end of the displaceable portion forms a radially outer rear edge and a radially inner rear edge, and wherein the axial position of the radially inner rear edge varies in rectangular form in the circumferential direction.
Figure 8:
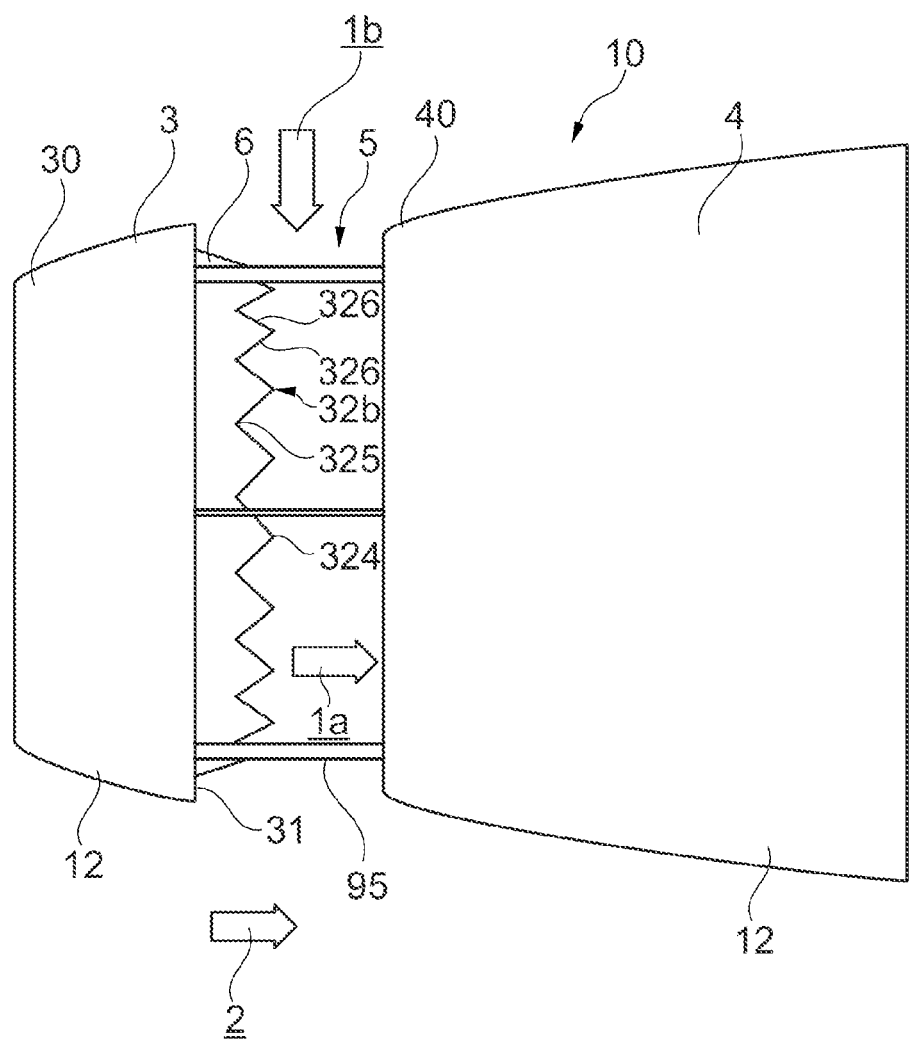
FIG. 8 shows a sectional view of an engine pod which forms a fixed portion and a displaceable portion, wherein the downstream end of the displaceable portion forms a radially outer rear edge and a radially inner rear edge, and wherein the axial position of the radially inner rear edge varies in zigzag form in the circumferential direction.
Figure 9:
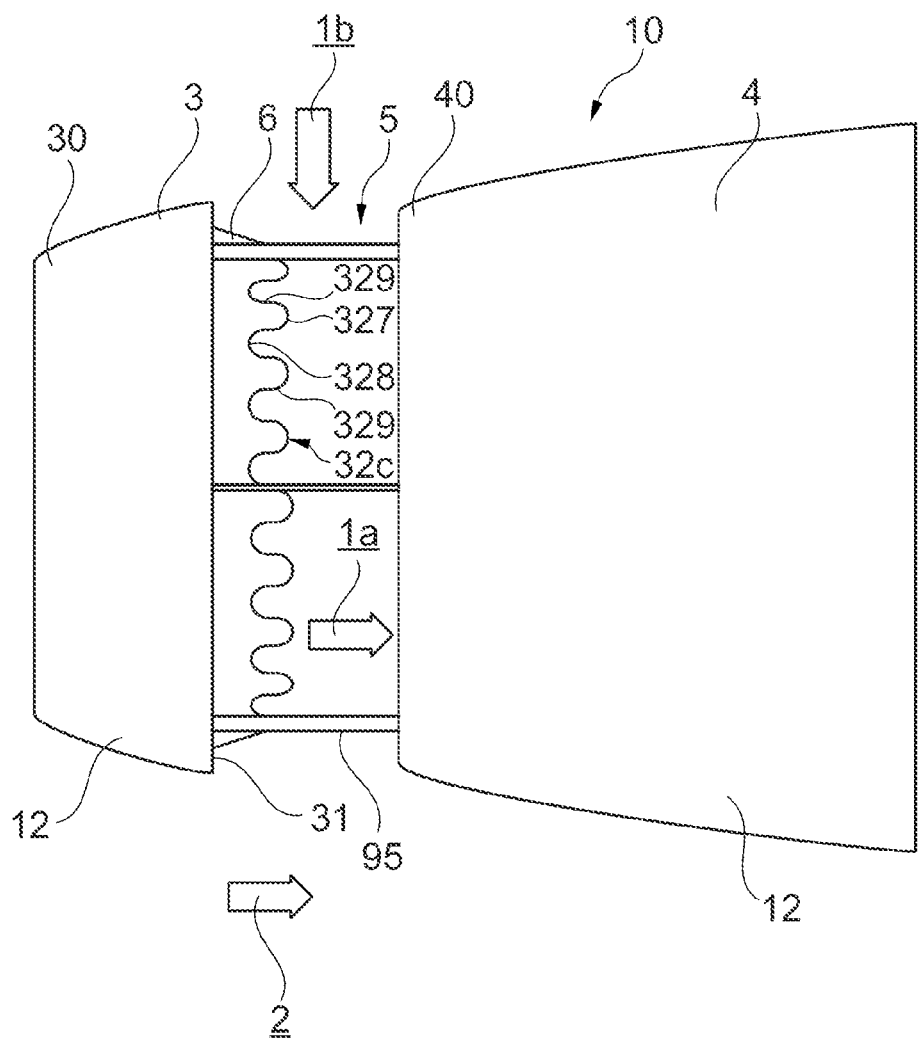
FIG. 9 shows a sectional view of an engine pod which forms a fixed portion and a displaceable portion, wherein the downstream end of the displaceable portion forms a radially outer rear edge and a radially inner rear edge, and wherein the axial position of the radially inner rear edge varies in undulating form in the circumferential direction.

FIGS. 7 to 9 show several exemplary embodiments of an invention variant in which a noise reduction is achieved by structural measures on the radially inner rear edge of the upstream portion 3. The invention variant in FIGS. 7 to 9 may be implemented in combination with the invention variants of FIGS. 2 to 6 or independently thereof.

The fundamental structure of the engine pod is the same as in the invention variant of FIGS. 2 to 6, so to this extent reference is made to the description of FIGS. 2 to 6. In particular, at its downstream end facing the fixed portion 4, the displaceable portion 3 has a radially outer rear edge 31 and a radially inner rear edge 32, wherein the radially inner rear edge 32 is arranged axially spaced from and hence downstream of the radially outer rear edge 31. A recess 6 is formed between the radially outer rear edge 31 and the radially inner rear edge 32.

FIG. 7 also shows webs 95 which connect the displaceable portion 3 to the fixed portion 4, wherein the displaceable portion 3 can be moved axially by a longitudinal adjustment of the webs 95. This is however merely exemplary and the axial movability of the displaceable portion 3 may alternatively be achieved in another fashion.

Here, the radially inner rear edge 32 does not run rectilinearly in the circumferential direction. Instead, it is provided that the axial position of the radially inner rear edge 32 varies in the circumferential direction. This variation may be periodic or non-periodic. In the exemplary embodiments shown in FIGS. 7 to 9, the variation is periodic.

The exemplary embodiment of FIG. 7 provides that the axial position of the radially inner rear edge 32a varies in rectangular form in the circumferential direction. Accordingly, the rear edge 32a is crenellated and has alternate axially rear portions 321 and axially front portions 322 which each extend in the circumferential direction and are connected via vertical flanks 323.

The exemplary embodiment of FIG. 8 provides that the axial position of the radially inner rear edge 32b varies in zigzag form in the circumferential direction. Accordingly, the radially inner rear edge 32b is formed from a straight sections 326 of equal length, which are arranged successively at the same angles, giving axially rear edges 324 and axially front edges 325.

The exemplary embodiment of FIG. 9 provides that the axial position of the radially inner rear edge 32c varies in undulating form in the circumferential direction. The variation may for example be sinusoidal or take the form of successively arranged semicircles. Accordingly, the radially inner rear edge 32c has curved portions 329 which connect axially rear maxima 327 and axially front minima 328.

In all exemplary embodiments of FIGS. 7 to 9, due to the varying axial position of the radially inner rear edge 32 in the circumferential direction, the coherence of the flow separation at the rear edge 32 is disrupted. As a result, there is no synchronous flow separation at the radially inner rear edge 32. This in particular disrupts the formation of stable eddies in the recess 6. This in turn means that air 1b flowing into the additional flow channel 5 can flow over the rear edges 31, 32 of the displaceable portion 3 with an acoustically more favorable turbulence, so that noise development is reduced.

The embodiment variants of a variation of the rear edge 32 shown in FIGS. 7 to 9 are merely exemplary. In principle, any periodic or non-periodic disruption of a rectilinear rear edge is suitable for disrupting the coherence of the flow separation at the rear edge 32.

The rear edge 32 consists for example of a sheet metal or composite material The form of the rear edge 32 may be produced for example by subsequent punching or during production of the rear edge 32.

It will be understood that the invention is not limited to the embodiments described above, and various modifications and improvements can be made without departing from the concepts described herein. It is also pointed out that any of the features described may be used separately or in combination with any other features, unless they are mutually exclusive. The disclosure extends to and comprises all combinations and sub-combinations of one or a plurality of features which are described here. If ranges are defined, said ranges thus comprise all of the values within said ranges as well as all of the partial ranges that lie in a range.

The invention claimed is:

1. An engine pod for a gas turbine engine, having:
a pod wall having an inside and an outside,
an engine intake which receives air necessary for an associated gas turbine engine and is delimited by the inside of the pod wall,
wherein the pod wall comprises:
a downstream fixed portion,
an upstream displaceable portion which is displaceable in the axial direction relative to the fixed portion between a first upstream position and a second downstream position,
wherein in the first upstream position of the displaceable portion, an annular additional flow channel is formed which extends between the fixed portion and the displaceable portion, wherein via the additional flow channel, surrounding air is flowable into the engine intake from the outside of the engine pod,
wherein in the second downstream position of the displaceable portion, the fixed portion and the displaceable portion adjoin one another, wherein the additional flow channel is closed, and
wherein at its downstream end facing the fixed portion, the displaceable upstream portion forms a radially outer rear edge and axially spaced therefrom, a radially inner rear edge, with a recess in between,
wherein adjacent to the recess, an air-permeable structure is formed in the displaceable portion which is intended and configured, in the first upstream position of the displaceable portion, to conduct air flowing in the region of the recess to the inside of the displaceable portion.

2. The engine pod according to claim 1, wherein the air-permeable structure is configured as a sandwich panel with a core layer in honeycomb form and with an inner cover layer, wherein the inner cover layer is provided with openings for air passage.

3. The engine pod according to claim 2, wherein the sandwich panel furthermore forms an outer cover layer, wherein the outer cover layer is also provided with openings for air passage.

4. The engine pod according to claim 1, wherein the air-permeable structure extends radially from the recess to the inside of the displaceable portion.

5. The engine pod according to claim 1, wherein at its upstream end, the fixed portion has a convex intake lip, a shape of which corresponds to a shape of the recess of the displaceable portion so that when the displaceable portion is in the second downstream position, the intake lip and the recess bear against one another.

6. The engine pod according to claim 5, wherein in the second downstream position of the displaceable portion, the air-permeable structure forms a sound-absorbing panel for engine noise.

7. The engine pod according to claim 6, wherein in the second downstream position of the displaceable portion, a sound-reflecting rear side of the sound-absorbing panel is formed by the intake lip of the fixed portion.

8. The engine pod according to claim 1, wherein the air-permeable structure is furthermore suitable for conducting air from the inside of the displaceable portion to the outside of the displaceable portion.

9. The engine pod according to claim 1, wherein a sound-absorbing structure is integrated in the fixed portion of the pod wall and is positioned in the fixed portion such that in the second downstream position of the displaceable portion, the sound-absorbing structure comes into contact with the air-permeable structure.

10. The engine pod according to claim 9, wherein the sound-absorbing structure of the fixed portion is configured as a sandwich panel with a core layer in honeycomb form and with an inner cover layer, wherein the inner cover layer is provided with openings for air passage, and wherein in the second downstream position of the displaceable portion, the inner cover layer adjoins the sound-absorbing sandwich panel.

11. The engine pod according to claim 1, wherein an axial position of the radially inner rear edge varies in a circumferential direction.

12. The engine pod according to claim 11, wherein the axial position of the radially inner rear edge varies periodically in the circumferential direction.

13. The engine pod according to claim 11, wherein the axial position of the radially inner rear edge varies in rectangular, zigzag or undulating form in the circumferential direction.

14. The engine pod according to claim 1, wherein the engine intake is a supersonic intake.

15. A gas turbine engine with an engine pod according to claim 1.

16. An engine pod for a gas turbine engine, having:
a pod wall having an inside and an outside,
an engine intake which receives air necessary for an associated gas turbine engine and is delimited by the inside of the pod wall,
wherein the pod wall comprises:
a downstream fixed portion,
an upstream displaceable portion which is displaceable in the axial direction relative to the fixed portion between a first upstream position and a second downstream position,
wherein in the first upstream position of the displaceable portion, an annular additional flow channel is formed which extends between the fixed portion and the displaceable portion, wherein via the additional flow channel, surrounding air is flowable into the engine intake from the outside of the engine pod,
wherein in the second downstream position of the displaceable portion, the fixed portion and the displaceable portion adjoin each other, wherein the additional flow channel is closed, and wherein at its downstream end facing the fixed portion, the displaceable portion forms a radially outer rear edge and axially spaced therefrom a radially inner rear edge, wherein an axial position of the radially inner rear edge varies in a circumferential direction.

17. The engine pod according to claim 16, wherein the axial position of the radially inner rear edge varies periodically in the circumferential direction.

18. The engine pod according to claim 16, wherein the axial position of the radially inner rear edge varies in rectangular form in the circumferential direction.

19. The engine pod according to claim 16, wherein the axial position of the radially inner rear edge varies in zigzag form in the circumferential direction.

20. The engine pod according to claim 16, wherein the axial position of the radially inner rear edge varies in undulating form in the circumferential direction.

* * * * *